(12) United States Patent
Lutjen et al.

(10) Patent No.: US 11,359,504 B2
(45) Date of Patent: Jun. 14, 2022

(54) SLIDING SEAL

(71) Applicant: United Technologies Corporation, Farmington, CT (US)

(72) Inventors: Paul M. Lutjen, Kennebunkport, ME (US); Jeremy Drake, South Berwick, ME (US); Timothy M. Davis, Kennebunk, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/384,488

(22) Filed: Apr. 15, 2019

(65) Prior Publication Data

US 2019/0242265 A1 Aug. 8, 2019

Related U.S. Application Data

(62) Division of application No. 14/642,040, filed on Mar. 9, 2015, now Pat. No. 10,260,364.

(51) Int. Cl.
*F01D 11/00* (2006.01)
*F16J 15/08* (2006.01)
(Continued)

(52) U.S. Cl.
CPC .......... *F01D 11/005* (2013.01); *F01D 11/003* (2013.01); *F16J 15/022* (2013.01); *F16J 15/0806* (2013.01); *F16J 15/0887* (2013.01); *F16J 15/102* (2013.01); *F16J 15/104* (2013.01); *F16J 15/3452* (2013.01);
(Continued)

(58) Field of Classification Search
CPC .......... F16J 15/002; F16J 15/02; F16J 15/024; F16J 15/025; F16J 15/08; F16J 15/0806; F16J 15/0887; F16J 15/10; F16J 15/102; F16J 15/104; F16J 15/34; F16J 15/3436; F16J 15/3452; F01D 11/003; F01D 11/005; F05D 2220/32; F05D 2220/321;
(Continued)

(56) References Cited

U.S. PATENT DOCUMENTS

RE22,116 E 6/1942 Janette
2,703,277 A 3/1955 Spendelow, Jr.
(Continued)

FOREIGN PATENT DOCUMENTS

BE 511690 A 12/1953
EP 0962688 A1 12/1999
(Continued)

OTHER PUBLICATIONS

English Machine Translation to BE511690.
(Continued)

*Primary Examiner* — Nathan Cumar
(74) *Attorney, Agent, or Firm* — Cantor Colburn LLP

(57) ABSTRACT

The present disclosure relates generally to a sliding seal between two components. The sliding seal includes a first seal section and an uncoupled second seal section which allows the first and second seal sections to move relative to one another during relative movement between the two components. One or more spring tabs extend from the second seal section and bias the first and second seal sections away from one another.

7 Claims, 11 Drawing Sheets

(51) Int. Cl.
*F16J 15/34* (2006.01)
*F16J 15/02* (2006.01)
*F16J 15/10* (2006.01)

(52) U.S. Cl.
CPC ...... *F05D 2220/32* (2013.01); *F05D 2240/55* (2013.01); *Y02T 50/60* (2013.01)

(58) Field of Classification Search
CPC ..... F05D 2220/3212; F05D 2220/3213; F05D 2220/3215–3219; F05D 2240/55
USPC ........................................................ 277/592
See application file for complete search history.

(56) References Cited

U.S. PATENT DOCUMENTS

| | | | |
|---|---|---|---|
| 2,859,079 A * | 11/1958 | Olson | F16J 9/20 277/477 |
| 3,253,836 A * | 5/1966 | Hamm | F16J 9/203 277/474 |
| 3,797,836 A | 3/1974 | Halling | |
| 4,071,269 A | 1/1978 | Halling et al. | |
| 4,087,099 A | 5/1978 | Kurio | |
| 4,090,720 A | 5/1978 | Morsbach et al. | |
| 4,095,005 A | 6/1978 | Kishida et al. | |
| 4,429,885 A | 2/1984 | Chiba et al. | |
| 4,448,449 A | 5/1984 | Halling et al. | |
| 4,477,086 A | 10/1984 | Feder et al. | |
| 4,759,555 A | 7/1988 | Halling | |
| 4,783,085 A | 11/1988 | Wicks et al. | |
| 5,014,917 A | 5/1991 | Sirocky et al. | |
| 5,078,412 A | 1/1992 | Baumgarth | |
| 5,197,853 A | 3/1993 | Creevy et al. | |
| 5,370,401 A | 12/1994 | Sandgren | |
| 5,697,620 A | 12/1997 | McMurtry et al. | |
| 5,947,479 A | 9/1999 | Ostrowski | |
| 6,076,835 A * | 6/2000 | Ress | F01D 11/005 277/637 |
| 6,203,025 B1 * | 3/2001 | Hayton | F01D 11/005 277/637 |
| 6,237,921 B1 | 5/2001 | Liotta et al. | |
| 6,322,081 B1 | 11/2001 | Ullah et al. | |
| 6,402,466 B1 | 6/2002 | Burdgick et al. | |
| 7,090,224 B2 | 8/2006 | Iguchi et al. | |
| 7,121,790 B2 | 10/2006 | Fokine et al. | |
| 7,163,206 B2 | 1/2007 | Cross et al. | |
| 7,207,771 B2 | 4/2007 | Synnott et al. | |
| 7,338,253 B2 | 3/2008 | Nigmatulin | |
| 7,347,425 B2 | 3/2008 | James | |
| 8,651,497 B2 * | 2/2014 | Tholen | F16J 15/0887 277/644 |
| 8,661,828 B2 | 3/2014 | Pieussergues et al. | |
| 9,435,266 B2 | 9/2016 | Zeaton et al. | |
| 9,512,735 B2 | 12/2016 | Davis | |
| 9,587,502 B2 | 3/2017 | Davis et al. | |
| 9,587,503 B2 | 3/2017 | Davis et al. | |
| 9,708,922 B1 | 7/2017 | Tyler, Jr. et al. | |
| 9,759,080 B2 | 9/2017 | Davis et al. | |
| 2003/0098547 A1 | 5/2003 | Yamada et al. | |
| 2004/0017045 A1 | 1/2004 | Cross et al. | |
| 2005/0220611 A1 | 10/2005 | Bhate et al. | |
| 2009/0243228 A1 | 10/2009 | Heinemann et al. | |
| 2011/0150635 A1 | 6/2011 | Motzkus et al. | |
| 2012/0156029 A1 | 6/2012 | Karafillis et al. | |
| 2012/0200046 A1 | 8/2012 | Green et al. | |
| 2012/0319362 A1 | 12/2012 | Tholen et al. | |
| 2013/0075976 A1 | 3/2013 | Davis et al. | |
| 2013/0113168 A1 | 5/2013 | Lutjen et al. | |
| 2014/0265161 A1 | 9/2014 | Sutterfield et al. | |
| 2016/0003080 A1 | 1/2016 | McGarrah | |
| 2016/0115809 A1 | 4/2016 | Davis et al. | |
| 2016/0115814 A1 | 4/2016 | Davis et al. | |
| 2016/0169022 A1 | 6/2016 | Davis | |
| 2016/0201493 A1 | 7/2016 | Davis | |
| 2016/0265377 A1 | 9/2016 | Lutjen et al. | |
| 2016/0298474 A1 | 10/2016 | Davis | |
| 2017/0241280 A1 | 8/2017 | Ponchak et al. | |

FOREIGN PATENT DOCUMENTS

| | | |
|---|---|---|
| EP | 3023599 A1 | 5/2016 |
| WO | 20015031384 A1 | 3/2015 |

OTHER PUBLICATIONS

European Office Action for Application No. 16 151 910.3; dated Aug. 30, 2018.
European Search Report for Application No. 16 15 1910.
European Search Report for Application No. 16 15 8491.

* cited by examiner

FORWARD ⟵⟶ AFT

FORWARD ←——→ AFT

SLIDING SEAL

CROSS REFERENCE TO RELATED APPLICATIONS

This application is a divisional of U.S. patent application Ser. No. 14/642,040 filed on Mar. 9, 2015, the entire contents of which is incorporated herein by reference thereto.

TECHNICAL FIELD OF THE DISCLOSURE

This present disclosure is generally related to seals and, more specifically, to a sliding seal.

BACKGROUND OF THE DISCLOSURE

Seals are used in many applications to prevent or limit the flow of a gas or liquid from one side of the seal to another side of the seal. For example, seals are used in many areas within a gas turbine engine to seal the gas path of the engine. The performance of gas path seals affects engine component efficiency. For example, the loss of secondary flow into the gas path of a turbine engine has a negative effect on engine fuel burn, performance/efficiency, and component life. A metal w-seal or a non-metallic rope seal are typical seals used to seal or limit secondary flow between segmented or full-hoop turbine components. However, exposure to significant relative deflections between adjacent components and/or elevated temperatures can preclude the use of these types of seals or cause them to fail prematurely. If subjected to significant deflections, a w-seal will deform and become ineffective. Using a higher strength material improves deflection capability somewhat, but generally at the expense of limiting temperature capability. Wear resistance can be a problem as well in an environment of significant relative motion. A rope seal typically has high temperature capability but has even less flexibility.

Improvements in seal design are therefore needed in the art.

SUMMARY OF THE DISCLOSURE

In one embodiment, a seal for sealing a seal cavity defined by first and second adjacent components disposed about an axial centerline is disclosed, the seal comprising: a split-hoop first seal section; and a split-hoop second seal section comprising a plurality of first spring tabs, wherein the plurality of first spring tabs contact the first seal section and are configured to axially load the first seal section against one of the first and second components; wherein the first seal section is configured to sealingly engage with the first and second components; and wherein the first and second seal sections are configured to move relative to one another.

In a further embodiment of the above, the first seal section comprises a first seal section free-state inner diameter that is smaller than a seal cavity inner diameter, such that a radial preload is achieved between the first seal section and at least one of the first and second components In a further embodiment of any of the above, the second seal section further comprises: a hoop including a single split at one location; wherein the plurality of first spring tabs frustoconically but primarily radially extend from said hoop.

In a further embodiment of any of the above, the hoop and the plurality of first spring tabs are integrally formed.

In a further embodiment of any of the above, one of a W-seal or M-seal is disposed within the seal cavity radially outboard from the first and second seal sections.

In a further embodiment of any of the above, the seal is formed from one of a high-temperature metal alloy, a high-temperature metal alloy, a high-temperature ceramic material, and a high-temperature ceramic composite, or a combination of two or more of a high-temperature metal alloy, a high-temperature metal alloy, a high-temperature ceramic material, and a high-temperature ceramic composite.

In a further embodiment of any of the above, a coating is applied to at least a portion of each of the first and second seal sections.

In a further embodiment of any of the above, a sheath covers at least a portion of each of the first and second seal sections.

In a further embodiment of any of the above, the first and second seal sections respectively define first and second gaps at respective opposed ends thereof.

In a further embodiment of any of the above, a bridging seal is disposed adjacent the first and second seal sections and at least partially covering the first and second gaps.

In a further embodiment of any of the above, a wear-resistant ring is coupled to a radially inner surface of the hoop.

In a further embodiment of any of the above, a slot is formed in the first seal section, wherein at least a portion of the hoop is disposed within the slot.

In a further embodiment of any of the above, a flange extends radially outboard from the hoop.

In a further embodiment of any of the above, at least one clip tab holds the second seal section in abutting relationship one of the first and second components.

In a further embodiment of any of the above, the second seal section further comprises a plurality of second spring tabs, wherein the plurality of second spring tabs are configured to contact the first seal section and bias the first seal section radially inboard against one of the first and second components.

In another embodiment, a system is disclosed, comprising: a first component including a first surface; a second component including a second surface, the second component disposed adjacent the first component and defining a seal cavity therebetween; wherein the first and second components are disposed about an axial centerline; and a seal disposed in the seal cavity, the seal including: a split-hoop first seal section; and a split-hoop second seal section comprising a plurality of first spring tabs, wherein the plurality of first spring tabs contact the first seal section and are configured to axially load the first seal section against one of the first and second components; wherein pressure within the seal cavity urges the seal to seat against the first surface and the second surface; and wherein relative movement of the first component and the second component causes the first and second seal sections to move relative to one another.

In a further embodiment of any of the above, the second seal section further comprises: a hoop including a single split at one location; wherein the plurality of first spring tabs frustoconically but primarily radially extend from said hoop.

In a further embodiment of any of the above, a wear-resistant ring is coupled to a radially inner surface of the hoop.

In a further embodiment of any of the above, a slot is formed in the first seal section, wherein at least a portion of the hoop is disposed within the slot.

In a further embodiment of any of the above, the second seal section further comprises a plurality of second spring tabs, wherein the plurality of second spring tabs are configured to contact the first seal section and bias the first seal section radially inboard against one of the first and second components.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
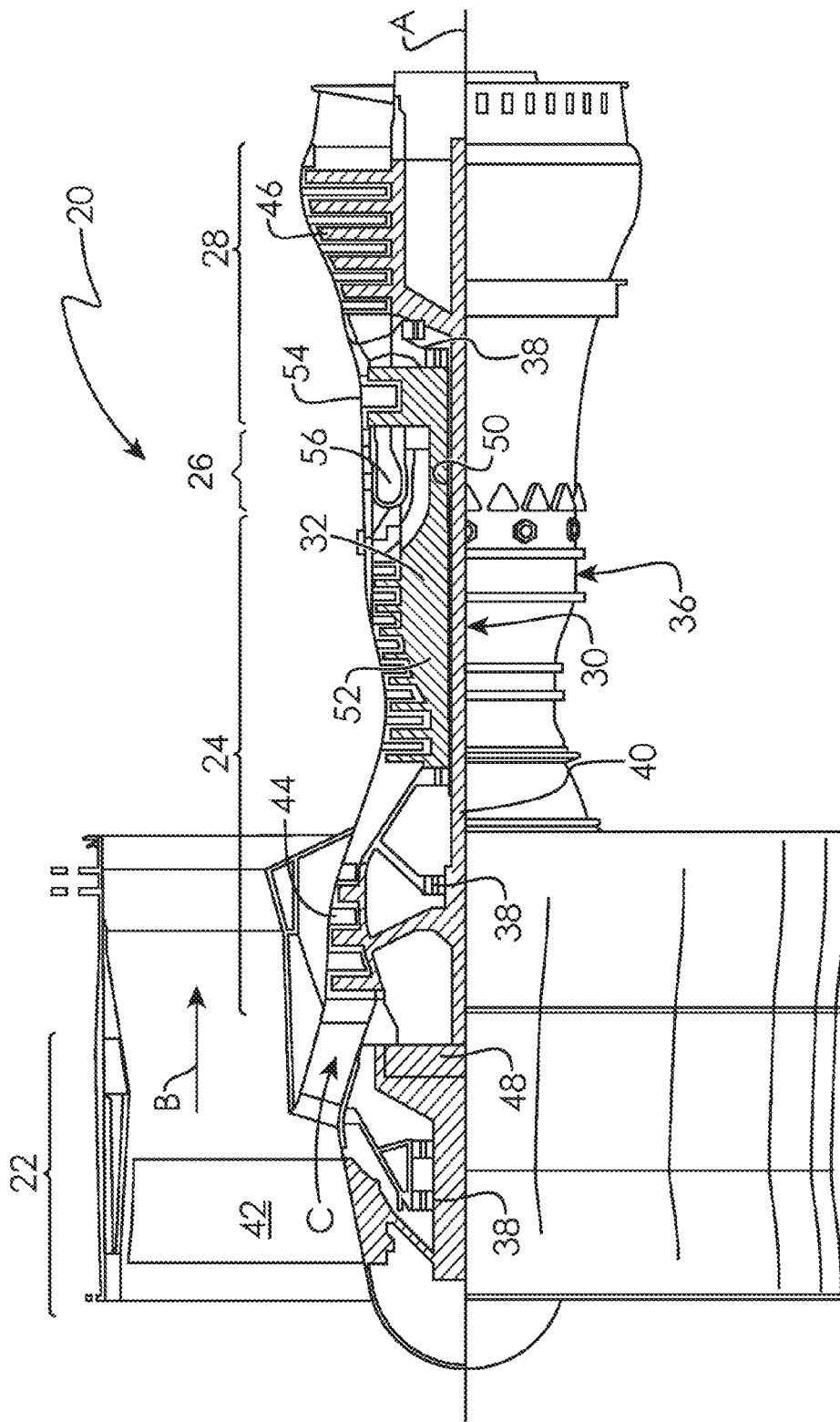
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 m/sec).

Figure 2:
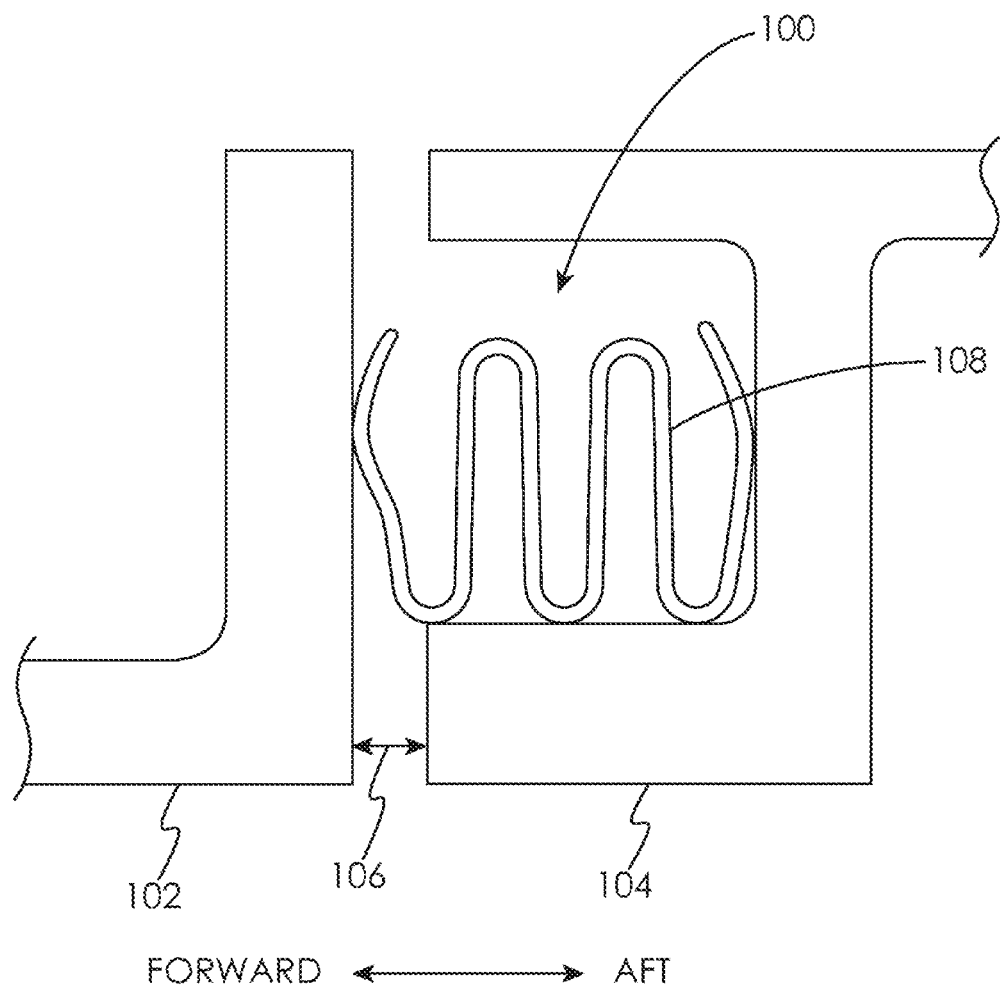
FIG. 2 is a schematic cross-sectional view of a seal and seal cavity in an embodiment.

FIG. 2 schematically illustrates a cross-sectional view of a seal cavity 100 formed by two axially-adjacent segmented or full-hoop turbine components 102 and 104 which may move axially, radially, and circumferentially relative to one another about an axial centerline of the turbine engine. It will be appreciated that although turbine components are used to demonstrate the positioning and functioning of the seals disclosed herein, this is done by way of illustration only and the seals disclosed herein may be used in other applications. A nominal design clearance 106 exists between the components 102 and 104. Within the seal cavity 100 lies a w-seal 108 formed from a material appropriate to the anticipated operating conditions (e.g., deflection, temperature change, pressure, etc.) of the w-seal 108, such a nickel-base alloy to name just one non-limiting example.

The design and material used in the construction of the w-seal 108 causes it to be deflected both forward and aft within the cavity 100, thereby causing it to seat against the components 102 and 104, even when the components 102 and 104 move relative to each other causing the clearance 106 to change. However, if subjected to significant deflections and/or temperature, a w-seal 108 may deform, causing it to become ineffective and potentially liberate.

Figure 3A:
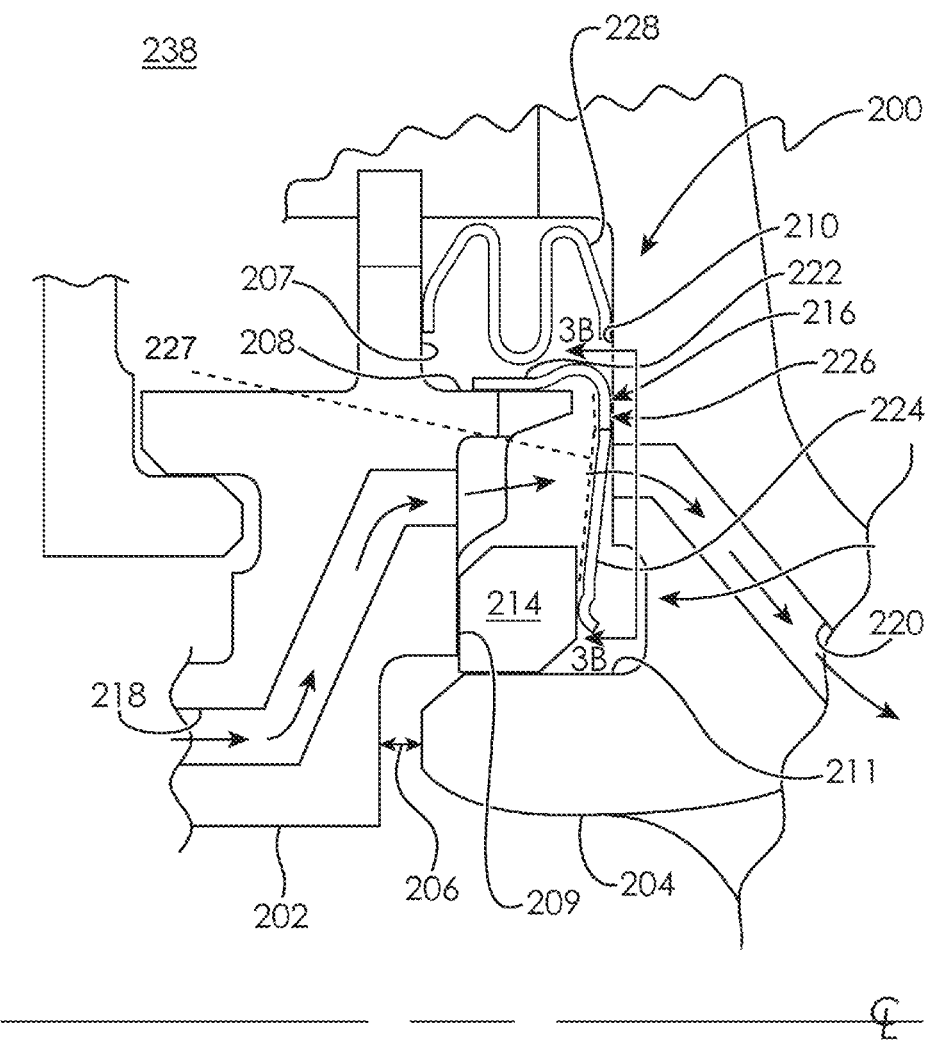
FIG. 3A is a schematic cross-sectional view of a seal and seal cavity in an embodiment.

FIG. 3A schematically illustrates a cross-sectional view of a seal cavity 200 formed by two axially-adjacent segmented or full hoop turbine components 202 and 204 which may move axially, radially, and circumferentially relative to one another about an axial centerline of the turbine engine. A nominal design clearance 206 exists between the components 202 and 204. Component 202 includes a generally-radially-extending surface 207, a generally axially-extending surface 208, and a generally-radially-extending surface 209 facing the seal cavity 200. The component 204 includes a generally radially-extending surface 210 and a generally axially-extending surface 211 facing the seal cavity 200. Within the seal cavity 200 lies a seal 212 formed from a material appropriate to the anticipated operating conditions of the seal 212, such as a high-temperature metal alloy, a low temperature metal alloy, a high temperature ceramic material, a high temperature ceramic composite, or a combination of two or more of these, to name just a few non-limiting examples. A secondary gas flow path 218 is formed through component 202 and a secondary gas flow path 220 is formed through component 204.

The seal 212 is formed from a first seal section 214 and a second seal section 216. The first seal section 214 is a split-hoop seal ring that contacts, slides, and seals against both components 202 and 204. The first seal section 214 may load radially inward against the surface 211 of component 204 via a preload that is achieved by an inner diameter of the first seal section 214 in the free-state that is smaller than the inner diameter of the seal cavity 200 at the surface 211. The relatively high stiffness and moment of inertia of the first seal section 214 enables this preload and helps to resist rolling of the first seal section 214. A pressure differential across the first seal section 214 provides additional axial loading against the surface 209 of the component 202 and radial loading against the surface 211 of the component 204.

Figure 3B:
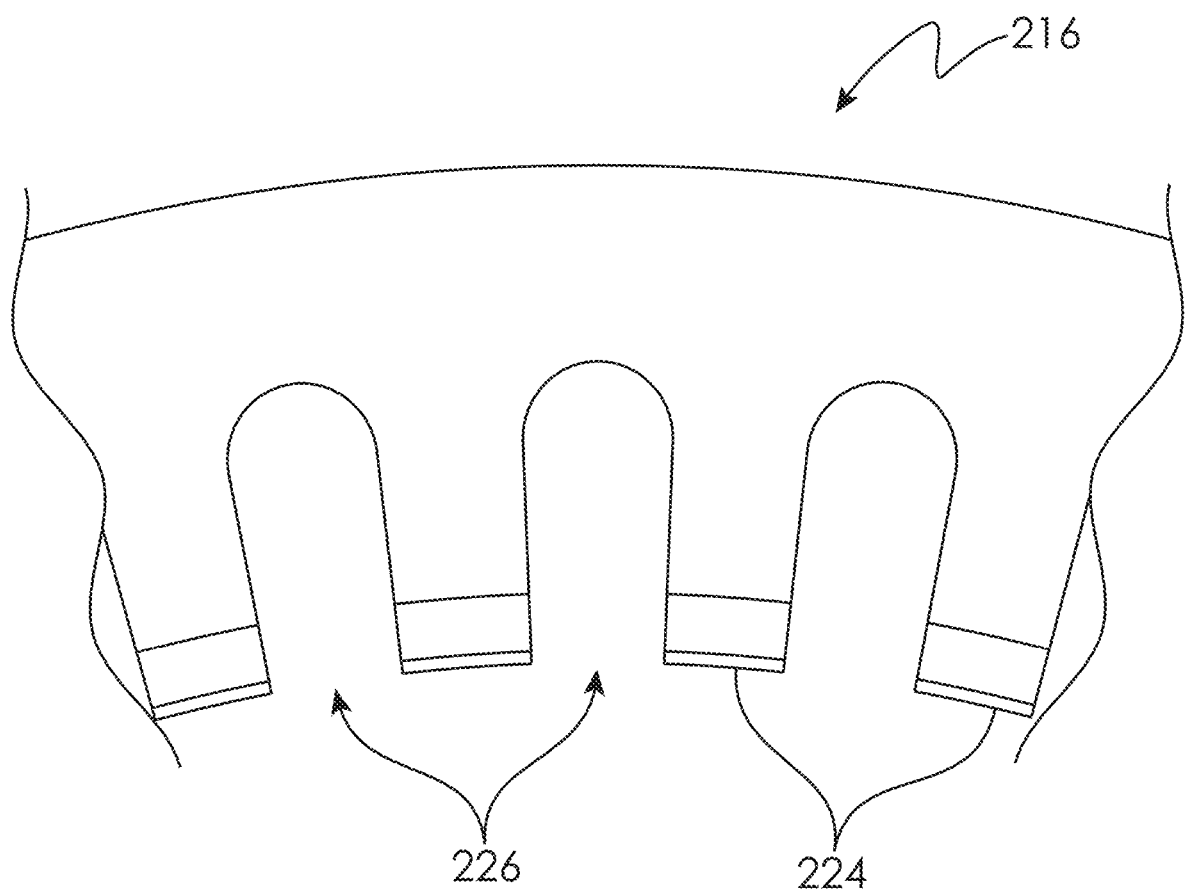
FIG. 3B is a schematic elevational view of a section of the seal of FIG. 3A in an embodiment.

The second seal section 216 comprises a split-hoop spring element that is operative to load the first seal section 214 axially forward against the surface 209 of the component 202. In an embodiment, the second seal section 216 may comprise a hoop 222 with a single split at its outer diameter and a plurality of frustoconically but primarily radially projecting spring tabs 224 spaced around its radially inner circumference. The spring tabs 224 may be integrally formed with the seal section 216, or they may be discrete pieces attached thereto. As best shown in FIG. 3B, a plurality of slots 226 are formed in the second seal section 216 between adjacent spring tabs 224. Although the spring tabs 224 are illustrated as having substantially the same circumferential width as the slots 226, it will be appreciated that in some embodiments the spring tabs 224 may be circumferentially narrower than the slots 226, or the spring tabs 224 may be circumferentially wider than the slots 226. These slots 226 allow gases in the secondary flow path 218 to flow into the seal cavity 200 and continue into the secondary flow path 220. The spring tabs 224 bias the seal sections 214, 216 axially away from one another, causing the seal section 214 to seat against the surface 209 of the component 202 and the seal section 216 to seat against the surface 210 of the component 204, even when the cavity 200 is not pressurized. This mitigates risk of damage to the seal 212 in transportation and ensures that the seal 212 is instantly and positively pressurized/pressure-energized at engine start-up. The seal 212 may include a coating and/or a sheath 213 to provide increased wear resistance. A W-seal (or M-seal) 228 may be positioned within the seal cavity 200 radially outboard from the seal 212 and engage the surface 207 of component 202 and the surface 210 of component 204.

Pressure in a secondary flow cavity 238 is transmitted to the seal cavity 200 through an opening defined by the components 202, 204. This pressure acts upon the surfaces of the seal sections 214, 216, thereby causing the hoop 222 to seat against the surface 208 of the component 202, and also causing the first seal section 214 to seat against the surface 209 of the component 202 and the surface 211 of the component 204. As the aft component 204 moves axially relative to the forward component 202, the axially-preloaded spring tabs 224 cause the hoop section 222 of the second seal section 216 to move with the component 204 so that a restriction is created that is beneficially redundant with the w-seal 228. The load applied by spring tabs 224 to the first seal section 214 helps the first seal section 214 to seat against the surface 209 of the component 202. The load applied by spring tabs 224 to the first seal section 214 additionally helps the second seal section 216 to seat against the surface 210 of the component 204. This prevents most or all of the secondary flow cavity 238 gases from reaching the design clearance 206 area and flow path. As the two components 202 and 204 move relative to each other in the axial and/or radial direction, the seal sections 214, 216 are free to slide relative to one another in the axial and radial directions (against the spring force of the spring tabs 224) and circumferential direction, while the pressure forces acting upon the surfaces of the seal section 214 loads the seal 212 so that it remains in contact with both components 202 and 204 as shown. Therefore, sealing is maintained while the components 202 and 204 and the components of the seal 212 move relative to one another. Because the seal sections 214, 216 slide with respect to one another and with respect to the components 202, 204, the seal 212 is not substantially deflected by the relative movement between the components 202 and 204 other than at the spring tabs 224.

Furthermore, the spring tabs 224 push the seal section 214 to remain in contact with the forward wall 209, and also push the seal section 216 to remain in contact with the aft wall 210 when the cavity 200 is not pressurized. This prevents the seal 212 from being damaged during transportation and installation, and also ensures that the seal 212 is instantly and positively pressurized/pressure-energized at engine start-up. The seal section 216 is split at one circumferential location to enable pressure to load the seal section 216 radially inward against the surface 208 of component 202. Splitting the seal section 214 also creates an additional sealing surface at the bottom of the seal cavity 200, as well as allowing the seal 212 to be packaged within a smaller radial design space. Leakage can be reduced significantly at the split location of each seal section 214, 216 by off-setting one split relative to the other, and further reduced by adding a sliding bridge or bridging seal 227 to the cover the gap in the radially outer seal section 216.

The second seal section 216 is shielded from hot gas path heat loads (i.e. convection and radiation) at the design clearance 206 so that a lower-temperature, higher-strength, more-resilient material (for example, Inconel® 718 to name just one non-limiting example) may be used. The first seal section 214 is not flexed/stressed, so that a lower-strength, higher-temperature, more wear resistant material (for example, a cobalt alloy to name just one non-limiting example) may be used. The heavy thickness of the first seal section 214 also makes it more wear tolerant.

Figure 4:
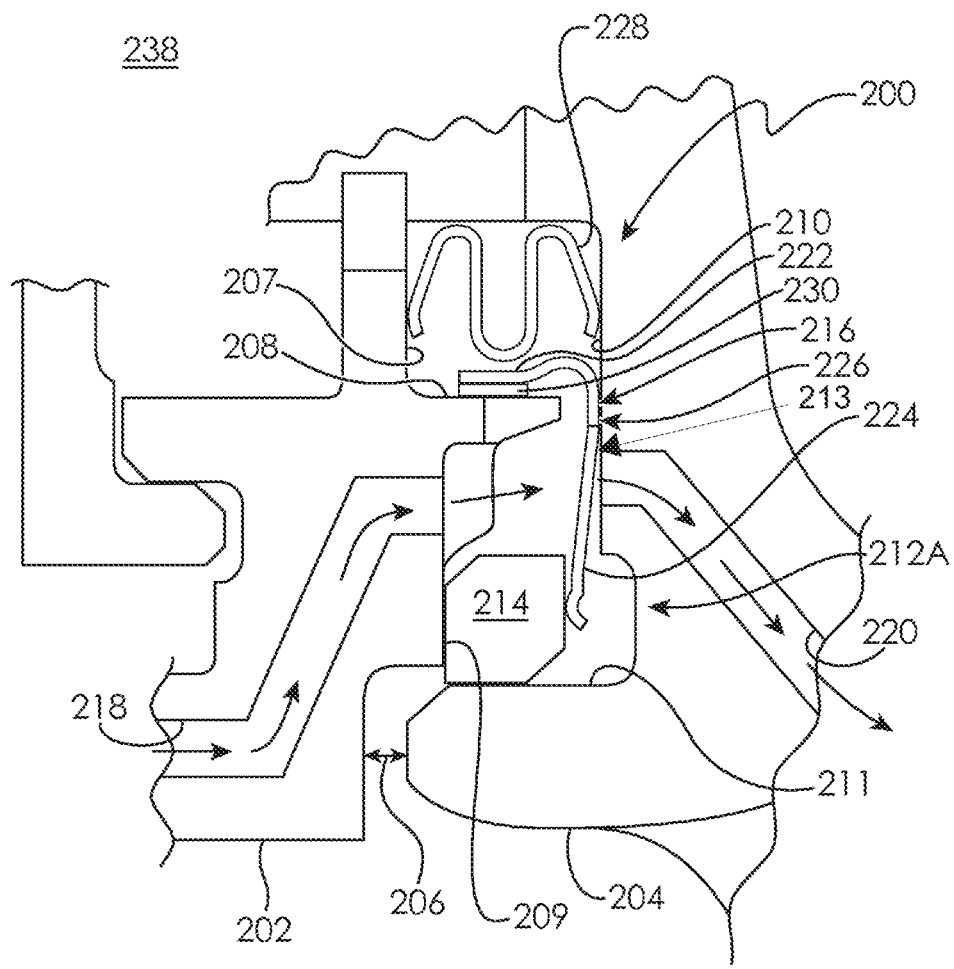
FIG. 4 is a schematic cross-sectional view of a seal and seal cavity in an embodiment.

Another embodiment of the seal 212 is illustrated in FIG. 4 and designated as 212A. In the seal 212A, a wear-resistant ring 230 is attached to the radially inner surface of the hoop 222 because in some embodiments the second seal section 216 comprises a high-strength material and the radially inner surface of the second seal element 216 experiences significant sliding on the surface 208 of component 202. The wear-resistant ring 230 may be made from a low-strength but lubricious material (such as a cobalt alloy, to name just one non-limiting example). The wear-resistant ring 230 may be attached to the second seal section 216 at a single circumferential location to allow circumferential growth of the wear-resistant ring 230 relative to the second seal section 216, due to differences in the coefficient of thermal expansion of the materials from which the wear-resistant ring 230 and the second seal section 216 are formed.

Figure 5:
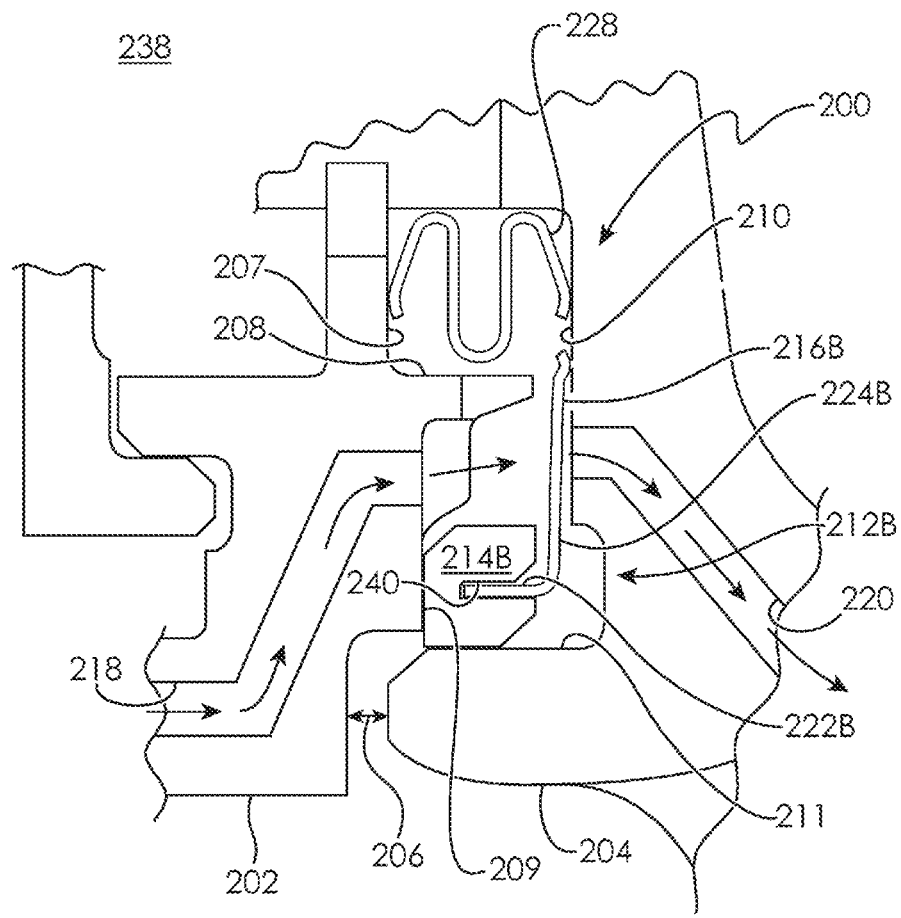
FIG. 5 is a schematic cross-sectional view of a seal and seal cavity in an embodiment.
Figure 5:

Another embodiment of the seal 212 is illustrated in FIG. 5 and designated as 212B. In the seal 212B, the second seal section 216B comprises a split hoop 222B positioned within a slot 240 formed in the first seal section 214B. In one embodiment, the slot 240 is formed in an aft surface of the first seal section 214B. Pre-loaded spring tabs 224B extend from the split hoop 222B and engage the surface 210 of the component 204 to load the first seal section 214B forward.

Figure 6A:
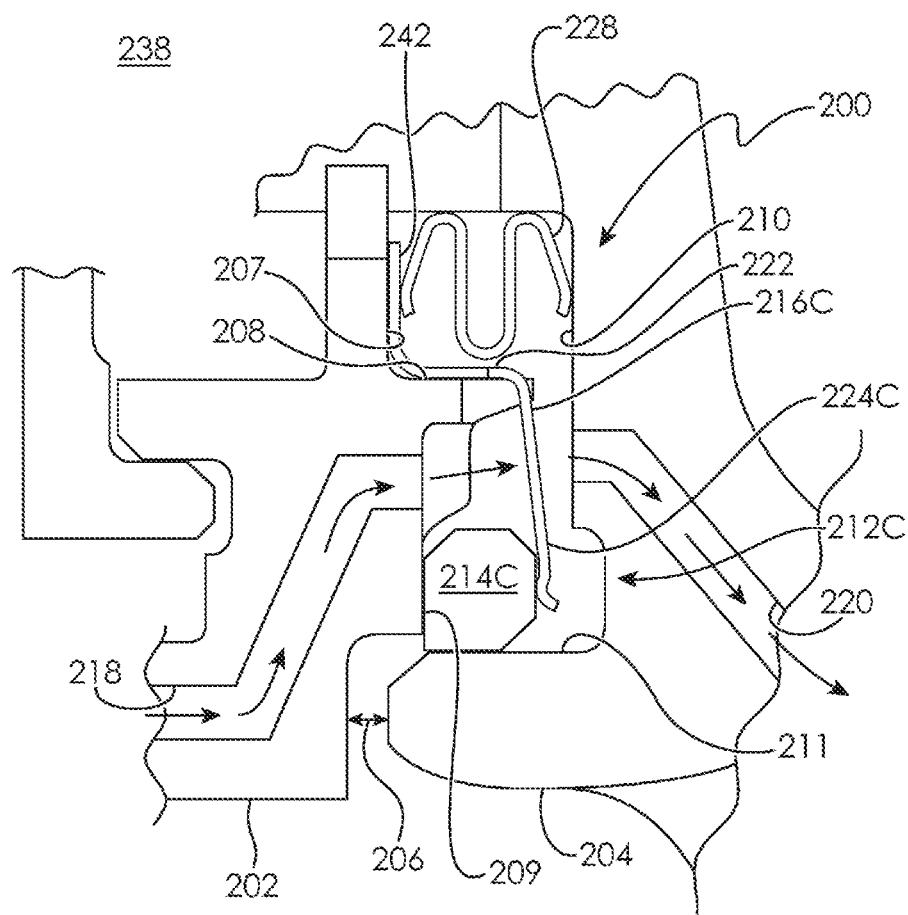
FIG. 6A is a schematic cross-sectional view of a seal and seal cavity in an embodiment.
Figure 6B:
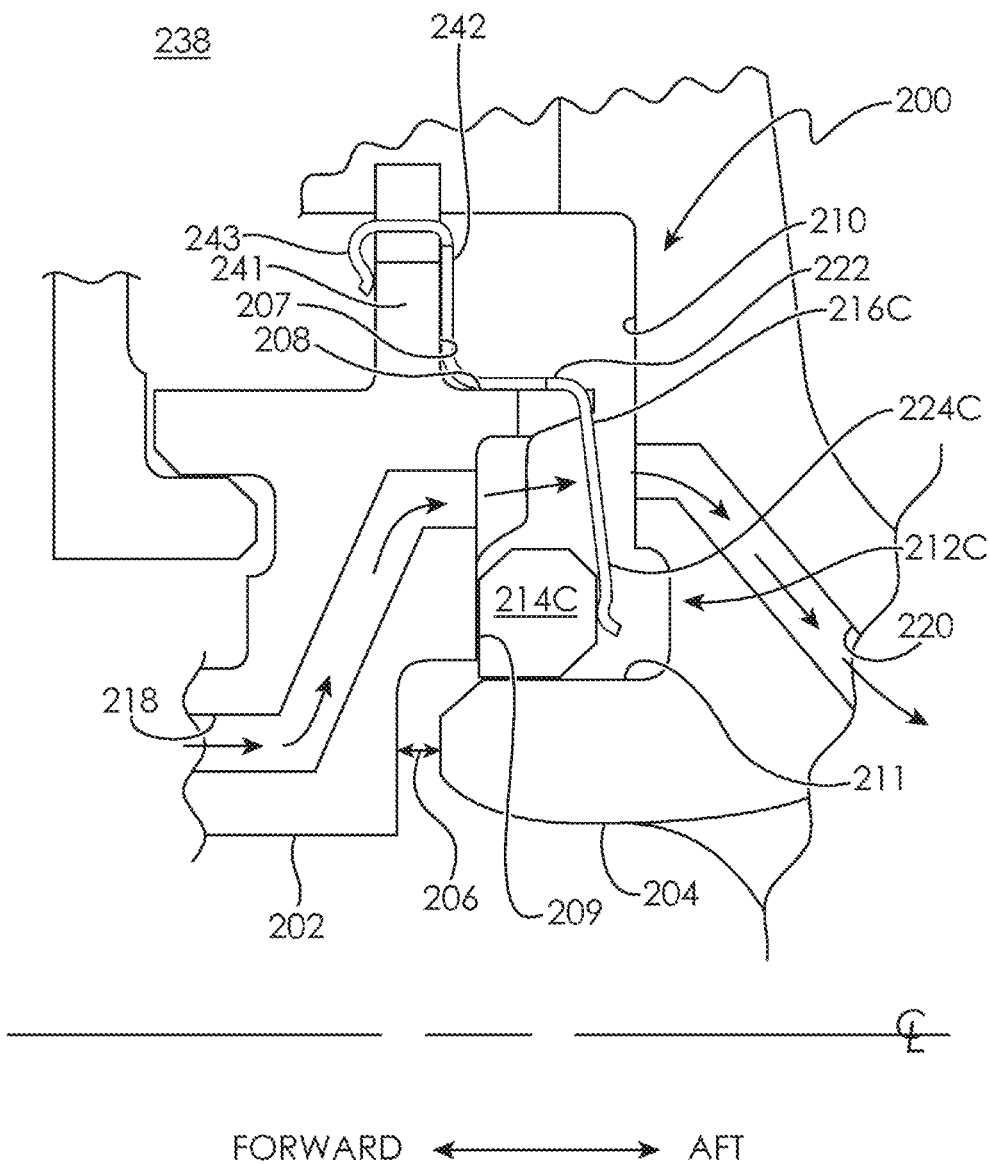
FIG. 6B is a schematic cross-sectional view of a seal and seal cavity in an embodiment.

Another embodiment of the seal 212 is illustrated in FIG. 6A and designated as 212C. In the seal 212C, a second seal section 216B includes an outboard radially-extending flange 242 that seals against the surface 207 of the component 202. The flange 242 is axially trapped by the M-seal 228. The spring tabs 224C are preloaded such that a predetermined axially-forward load is maintained against the first seal section 214C. The seal 212C causes the spring tabs 224C to be strained/stressed less than the spring tabs 224 and 224B because only minimal preload is required, i.e., just enough preload to ensure the second seal section 216C is loaded at assembly. In operation, the first seal section 214C and the second seal section 216C move together with the forward component 202, as compared to the previous embodiments where the spring tabs 224 of the of the second seal element 216 flex as the aft component 204 moves axially forward and aft relative to the forward component 202. Consequently the second seal section 216C can be made from a lower-strength material such that higher-temperature capability and improved lubricity/wear-resistance can be achieved. Reduced flexing of the spring tabs 224C may also enable the second seal section 216C to be made from a thicker sheet stock. Additionally, this embodiment may be able to accommodate a seal cavity with more-significant relative axial motion between components 202 and 204. In the embodiment of FIG. 6B, the outer M-seal 242 is eliminated and the second seal section 216C is positioned by way of local clip tabs 243 that extend over radially-extending wall 241 of component 202. The embodiment of FIG. 6B is able to accommodate even higher relative axial motion since flexure of the seal 212 is limited to the preload required for the second seal section 216C.

Figure 7:
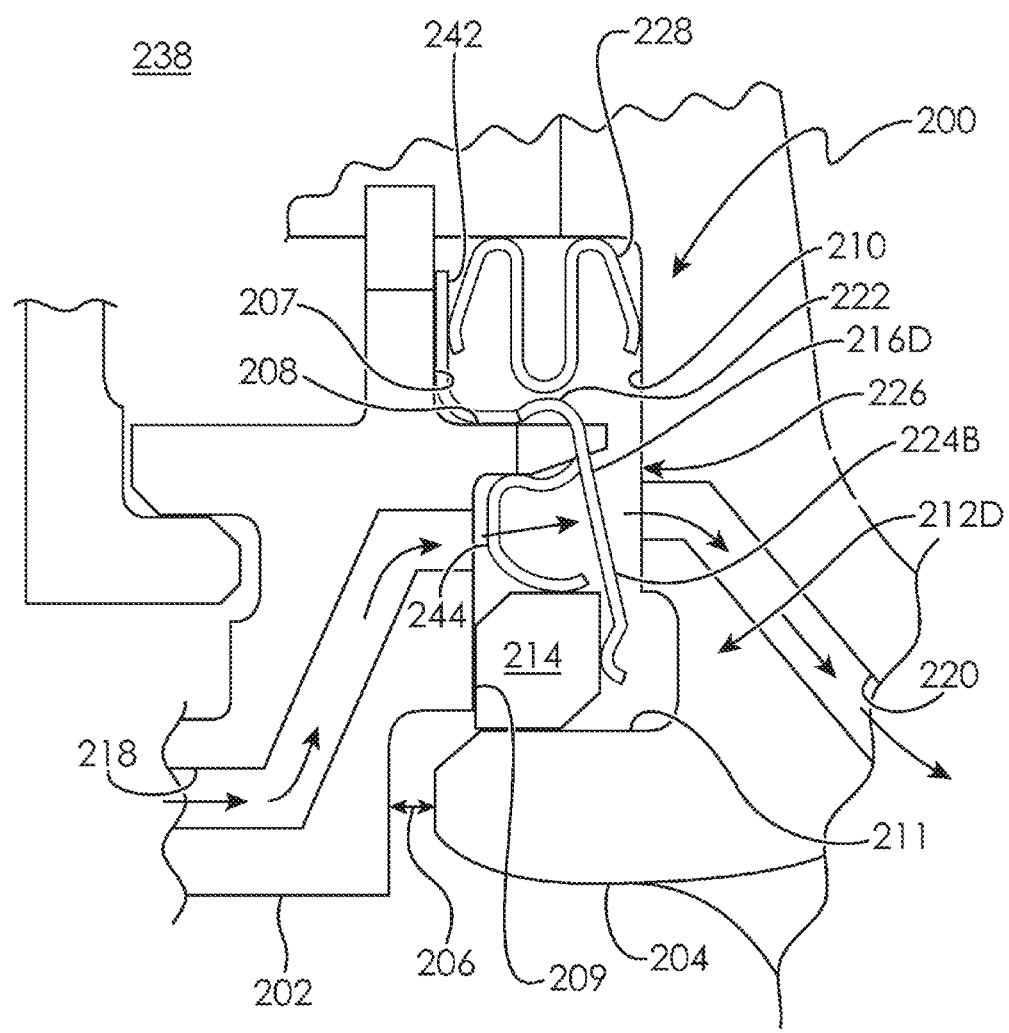
FIG. 7 is a schematic cross-sectional view of a seal and seal cavity in an embodiment.
Figure 8:
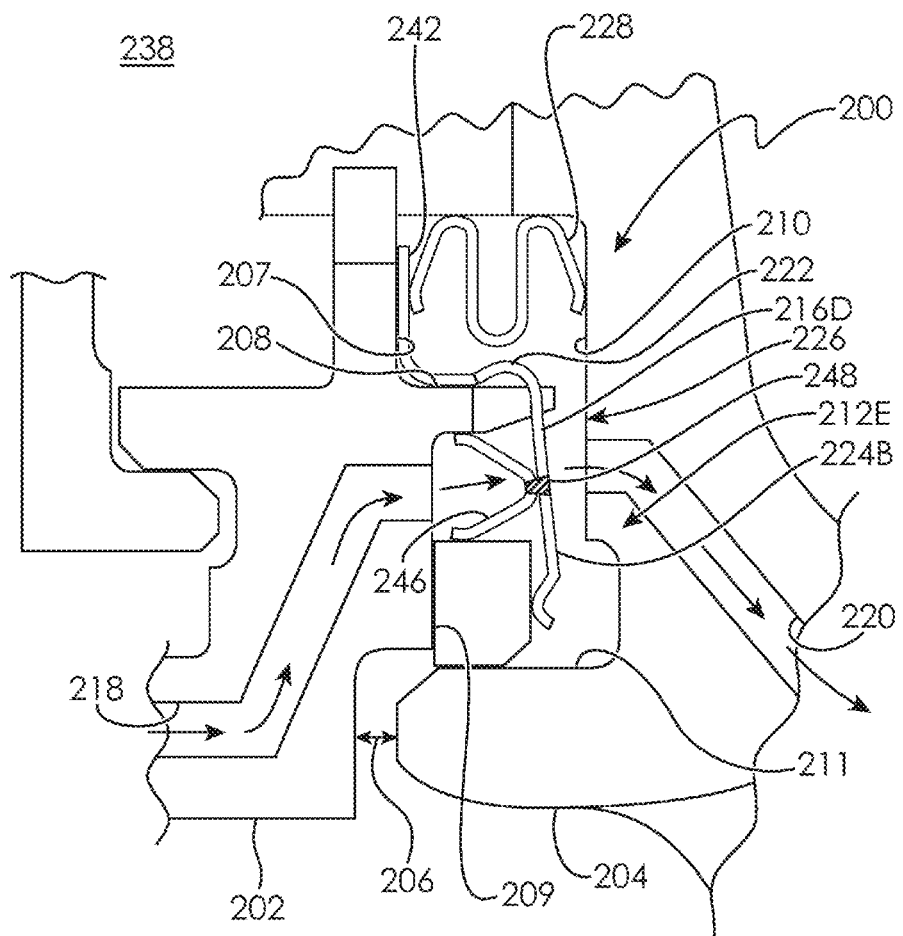
FIG. 8 is a schematic cross-sectional view of a seal and seal cavity in an embodiment.

Another embodiment of the seal 212 is illustrated in FIG. 7 and designated as 212D. In the seal 212D, a plurality of spring tabs 244 are disposed between the spring tabs 224. In the embodiment of FIG. 8, a seal 212E is illustrated in which a plurality of spring tabs 246 are coupled to respective ones of the spring tabs 224, such as by welds 248 to name just one non-limiting example. The spring tabs 244/246 load the first seal section 214 inboard against the radial contact surface 211 of the component 204, a load that is in addition to the differential pressure load and the preload of the first seal section 214.

Figure 9:
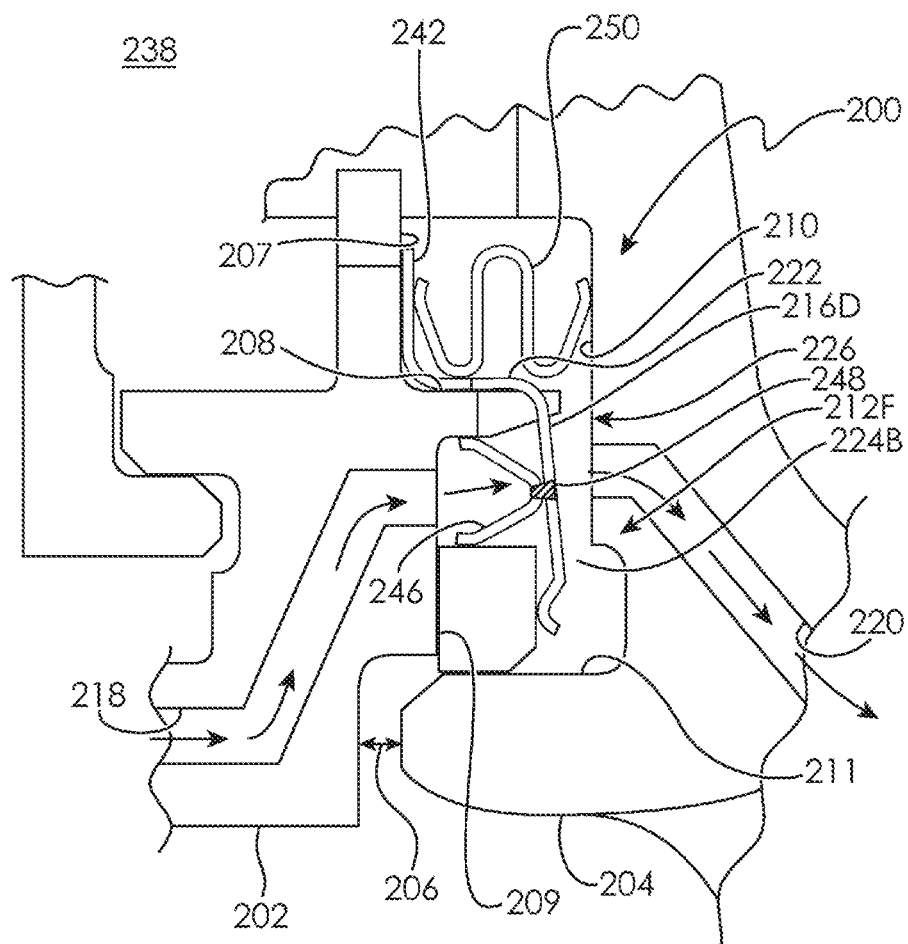
FIG. 9 is a schematic cross-sectional view of a seal and seal cavity in an embodiment.

Another embodiment of the seal 212 is illustrated in FIG. 9 and designated as 212F. In the seal 212F, a W-seal 250 is used instead of the M-seal 228 illustrated in FIGS. 3-8. The direction of pressure differential in the seal cavity 200 in some embodiments favors the use of a W-seal 250, and the disclosed embodiments that incorporate a second seal section 216 with flange 242 surface that extends further radially outward against which the W-seal 250 can seat.

Compared to the seal 108, the seal 212 exhibits improved durability (i.e. much more robust) relative to a w-seal 108. The first seal section 214 is more wear tolerant and wear resistant because the wall thickness is much greater, and a more-lubricious (lower-strength) material can be used. Because of the design of the seal 212, the first seal section 214 and the second seal section 216 have higher temperature capability. The first seal section 214 can be made from a higher-temperature material since it is not flexed/strained/stressed. The second seal section 216 can be made from a higher-strength material because it is shielded from the gas path as well as the hottest surfaces of the components 202/204. The seal 212 may exhibit improved vibration tolerance due to thicker walls and friction damping. The seal 212 is more resilient because the spring tabs of the second seal section 216 are: a) significantly taller than the w-seal 108, and b) are local/narrow features rather than a continuous hoop. In embodiments where the second seal section is trapped by the outer m-seal 228/w-seal 250, the spring tabs 224 are flexed/stressed significantly less and the stress is constant rather than cyclic. The seal 212 potentially has a higher moment of inertia to enable more radial preload to be achieved and to resist rolling of the first seal section 214.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. An assembly of a gas turbine engine, comprising a seal for sealing a seal cavity located between first and second adjacent components of the gas turbine engine, the first and second adjacent components being disposed about an axial centerline of the gas turbine engine, wherein the first and second adjacent components can move axially, radially and circumferentially relative to one another, the seal comprising:
    a split-hoop first seal section; and
    a second seal section comprising a plurality of first spring tabs defining a plurality of slots, wherein the plurality of slots allow gases in a secondary flow path of the first component to flow into the seal cavity and continue into a secondary flow path of the second component, wherein the plurality of first spring tabs contact the first seal section and axially load the split-hoop first seal section against one of the first and second adjacent components;
    wherein the split-hoop first seal section is configured to sealingly engage with the first and second adjacent components;
    wherein the split-hoop first seal section and the second seal sections directly contact each other and are configured to slide relative to one another in a circumferential direction; and
    wherein the second seal section further comprises:
    a hoop including a single split at one location;
    wherein the plurality of first spring tabs frustoconically and radially extend from said hoop.

2. The assembly of claim 1, further comprising a flange extending radially outboard from the hoop.

3. An assembly of a gas turbine engine, comprising a seal for sealing a seal cavity located between first and second adjacent components of the gas turbine engine, the first and second adjacent components being disposed about an axial centerline of the gas turbine engine, wherein the first and second adjacent components can move axially, radially and circumferentially with respect to each other, the seal comprising:
    a split-hoop first seal section; and
    a split-hoop second seal section comprising a plurality of first spring tabs defining a plurality of slots, wherein the plurality of slots allow gases in a secondary flow path of the first component to flow into the seal cavity and continue into a secondary flow path of the second component, wherein the plurality of first spring tabs contact the split-hoop first seal section and axially load the split-hoop first seal section against one of the first and second adjacent components;
    wherein the split-hoop first seal section is configured to sealingly engage with the first and second adjacent components; and
    wherein the split-hoop first seal section and the split-hoop second seal sections are configured to move relative to one and the split-hoop second seal section further comprises a plurality of second spring tabs, wherein the plurality of second spring tabs are configured to contact the split-hoop first seal section and bias the split-hoop first seal section radially inboard against one of the first and second adjacent components.

4. A system, comprising:
    a first component including a first surface;
    a second component including a second surface, the second component disposed adjacent to the first component and defining a seal cavity therebetween;
    wherein the first and second components are disposed about an axial centerline; and
    a seal disposed in the seal cavity, the seal including:
    a split-hoop first seal section; and
    a second seal section comprising a plurality of first spring tabs, wherein the plurality of first spring tabs directly contact the split-hoop first seal section and are configured to axially load the split-hoop first seal section against one of the first and second components;
    wherein pressure within the seal cavity urges the seal to seat against the first surface and the second surface; and
    wherein relative movement of the first component and the second component causes the split-hoop first seal section and the second seal sections to move relative to one another in a circumferential direction.

5. The system of claim 4, wherein the second seal section further comprises:
    a hoop including a single split at one location;
    wherein the plurality of first spring tabs frustoconically and radially extend from said hoop.

6. The system of claim 4, wherein the second seal section further comprises a plurality of second spring tabs, wherein the plurality of second spring tabs are configured to contact the split-hoop first seal section and bias the split-hoop first seal section radially inboard against one of the first and second components.

7. The system of claim 6, wherein the second seal section further comprises:
    a hoop including a single split at one location;
    wherein the plurality of first spring tabs frustoconically and radially extend from said hoop.

* * * * *